United States Patent [19]
Harimoto

[11] Patent Number: 5,184,899
[45] Date of Patent: Feb. 9, 1993

[54] NEEDLE ROLLER BEARING HAVING TWO-PIECE ROLLER RETAINER

[75] Inventor: Kazuyoshi Harimoto, Iwata, Japan

[73] Assignee: NTN Corporation, Osaka, Japan

[21] Appl. No.: 903,330

[22] Filed: Jun. 24, 1992

[30] Foreign Application Priority Data

Jun. 28, 1991 [JP] Japan ................................. 3-58244
Mar. 30, 1992 [JP] Japan ................................. 4-27068

[51] Int. Cl.$^5$ ............................................. F16C 41/04
[52] U.S. Cl. ................................ 384/560; 384/448; 384/577
[58] Field of Search ............ 384/560, 448, 577, 909, 384/572, 527

[56] References Cited

U.S. PATENT DOCUMENTS

| | | | |
|---|---|---|---|
| 4,223,963 | 9/1980 | Glodin et al. | 384/527 |
| 4,397,507 | 8/1983 | Kraus et al. | 384/577 |
| 4,708,498 | 11/1987 | Labedan et al. | 384/560 |
| 5,044,787 | 9/1991 | Hupfer et al. | 384/577 |

*Primary Examiner*—Lenard A. Footland
*Attorney, Agent, or Firm*—Birch, Stewart, Kolasch & Birch

[57] ABSTRACT

A needle roller bearing of a type empolying a generally cylindrical needle roller retainer of two-piece construction for supporting a plurality of needle rollers. The roller retainer is comprised of retainer segments each having opposite side edges. The retainer segments are connected together by means of at least one bond deposit filling up a gap between one of the opposite side edges of one of the retainer segments and a mating one of the opposite side edges of the other of the retainer segments, respectively. As a bonding material forming the bond deposit, a viscous material containing, as a principal component, vinyl acetate resin, or a hot-melt bonding material, both exhibiting a bondability lowering a high temperature, may be employed. When the needle roller bearing is in use, the bond deposit detaches from the gap or melt to separate the retainer segments from each other, allowing the separated retainer segments to function individually to minimize a fretting phenomenon.

5 Claims, 3 Drawing Sheets

NEEDLE ROLLER BEARING HAVING TWO-PIECE ROLLER RETAINER

BACKGROUND OF THE INVENTION

1. Field of the Invention

The present invention generally relates to a roller bearing and, specifically, to a needle roller bearing having a roller retainer of two-piece construction suited for mounting on, for example, an automotive transmission idler shaft or a big end of a connecting rod of a reciprocating engine.

2. Description of the Prior Art

The needle roller bearing of a type having a roller retainer is widely utilized in automotive vehicles and various kinds of industrial machinery because of its light-weight, compact structure. By way of example, in an automotive transmission comprising a synchro mechanism 50 shown in FIG. 4, the needle roller bearing is utilized as an idler bearing 53 through which a transmission gear 51 is mounted on a transmission shaft 52. According to the prior art, this type of needle roller bearing used as the idler bearing 53 is generally available in two types; one including a roller retainer of one-piece construction and the other including a roller retainer of split construction. By the reason which will now be described, the idler bearing 53 is generally preferred to employ the needle roller bearing of a type including the roller retainer of split construction to minimize a fretting phenomenon.

As is well known to those skilled in the art, when the automotive transmission is in a drive position with an automotive engine being loaded, the transmission gear 51 and the transmission shaft 52 rotate together therewith and, at this time, rotation of the idler bearing 53 relative to the transmission gear 51 and the transmission shaft 52 becomes zero. Under this condition, the needle rollers, generally identified by 54, undergo a minute vibratory motion at the same respective positions where they are positioned, rubbing respective outer and inner track surfaces of the inner and outer races 52 and 51. The consequence is that portions of the outer track surface of the inner race 52 aligned with the respective needle rollers 54 and portions of the inner track surface of the outer race 51 aligned also with the respective needle rollers 54 are worn to such an extent that an undulating pattern of indentations generally complemental to a pattern of the needle rollers, that is, a fretting marking, is left on the outer and inner track surfaces of the respective inner and outer races 52 and 51.

Where the roller retainer is of split construction having at least one crevice defined therein in a direction parallel to any one of the needle rollers, the crevice permits one portion of the roller retainer in a non-loaded region to undergo a relative motion in a direction circumferentially away from and close towards the other portion and, therefore, the possibility of occurrence of the fretting marking can be minimized as compared with the roller retainer of one-piece construction.

The split construction is known as available in two designs; one comprising a generally C-shaped roller retainer and the other comprising a pair of generally semicircular retainer segments of similar shape. The use of the roller retainer comprising the semicircular retainer segments can enhance a further minimization of the possible occurrence of the fretting marking.

Since the needle roller bearing of the type wherein the roller retainer is comprised of the retainer segments of similar shape which permits a mounting of the roller retainer segments from a radial direction, this type of needle roller bearing is largely employed on a big end of a connecting rod. However, when the needle roller bearing comprising the retainer of two-piece construction is desired to be mounted in a manner similar to the idler bearing 53 which is, so far shown in FIG. 4, mounted on the shaft 52 by inserting it in a direction axially of the shaft 52, it is necessary that the two retainer segments have to be separately mounted. In addition, at the time the transmission gear 51 is to be mounted on the idler bearing 53 after the retainer 55 has been mounted on the shaft 52, the retainer 55 if composed of the two retainer segments may separate away from the shaft 52 and fall by gravity unless held in position by an assembly attendant worker or by the use of a tool, consequently constituting a cause of reduction in working efficiency.

Also, since the retainer segments are members separate from each other, the needle roller bearing comprising the retainer of two-piece construction requires an increased number of component parts, making it cumbersome and inconvenient to store and transport.

It is pointed out that, in the needle roller bearing comprising the roller retainer of one-piece construction, an attempt has been made to employ an increased number of needle rollers to minimize a contact pressure, or to employ an increased radial clearance between the shaft and the needle rollers, both in an attempt to further minimize the possible formation of the fretting marking. However, the increase in number of the needle rollers results in a reduction in space between each neighboring needle rollers which may in turn bring about a reduction in size of a pillar portion of the roller retainer existing in the space to cause a reduction in physical strength of the roller retainer. On the other hand, the increase in radial clearance over a certain limit will result in that the needle roller bearing in operation may generate a considerable noise and a vibration.

SUMMARY OF INVENTION

Accordingly, the present invention has been devised to provide a needle roller bearing utilizing a needle roller retainer of two piece construction, which is effective to minimize an occurrence of the fretting phenomenon and which is easy to install on a machine element, thereby to improve a work efficiency, and also easy simplify to transport and storage.

To this end, according to a preferred embodiment of the present invention, a needle roller bearing comprises a generally cylindrical roller retainer for supporting a plurality of needle rollers. The roller retainer is comprised of circumferentially separated retainer segments each having opposite side edges, said retainer segments being connected together by means of a bond deposit formed between the side edge of one of the retainer segments and the mating side edge of the other of the retainer segments, respectively, thereby to complete said roller retainer.

It is to be noted that the term "bond deposit" used herein in connection with the present invention is to be understood as including any material operable to connect members together, and among such bond deposits some specific bond deposits which can lower or lose its bondability when heated to a certain temperature are used. Examples of material forming the specific bond deposits include, for example, viscous material containing, as its principal component, vinyl acetate resin, and a hot-melt bonding material.

The vinyl acetate resin referred to above has a property that, when heated to a temperature equal to or higher than 60° C. and preferably not higher than 100° C. under normal pressures, a softening takes place accompanied by a lowering of the bondability to such an extent that the bond deposits can detach from gaps defined between the opposite side edges of one of the retainer segments and the mating side edges of the other of the retainer segments.

On the other hand, the hot-melt bonding material referred to above has a property of melting when heated to a temperature equal to or higher than 60° C. under normal pressures.

With this construction, the two retainer segments when connected together can be handled as a single integer of a needle roller retainer. Because of this, there is no substantial need to mount the outer race while the retainer segments are manually held in position should one or both of the retainer segments fall by gravity or separate from the position where they should have been held. This brings about not only an improvement in work efficiency, but also a convenience in transport and storage.

When in use, however, as a result of an increase in temperature incident to an operation of a machine in which the needle roller bearing embodying the present invention is installed, the bondability of the bond deposit is lowered, eventually allowing the retainer segments to separate from each other with the bond deposit detaching from the gap between the retainer segments or melting off therefrom. Therefore, the needle roller retainer functions as that of a two-Piece construction.

Once the retainer segments have been separated from each other in the manner described above within the annular space between the inner and outer races, circumferentially spaced gaps (crevices) corresponding to a thickness of the bond deposit, which has been detached or melted, and a radial clearance between the needle roller and an inner race are formed between the retainer segments. Accordingly, the separated retainer segments are allowed to displace relative to each other in a circumferential direction by a distance corresponding to the gaps. Therefore, when the inner and outer races rotate together therewith, namely, in idling, one of the retainer segments which is positioned on a trailing side with respect to the direction in which the load acts is held substantially in a non-loaded state with no driving force transmitted thereto and, consequently, an angular movement of the retainer segment about the longitudinal axis of the needle roller bearing is delayed a length of time determined by the size of the gap. Therefore, any possible occurrence of the fretting phenomenon can advantageously be minimized or substantially eliminated.

BRIEF DESCRIPTION OF THE DRAWINGS

In any event, the present invention will become more clearly understood from the following description of a preferred embodiment thereof, when taken in conjunction with the accompanying drawings. However, the embodiment and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENT

Figure 1:
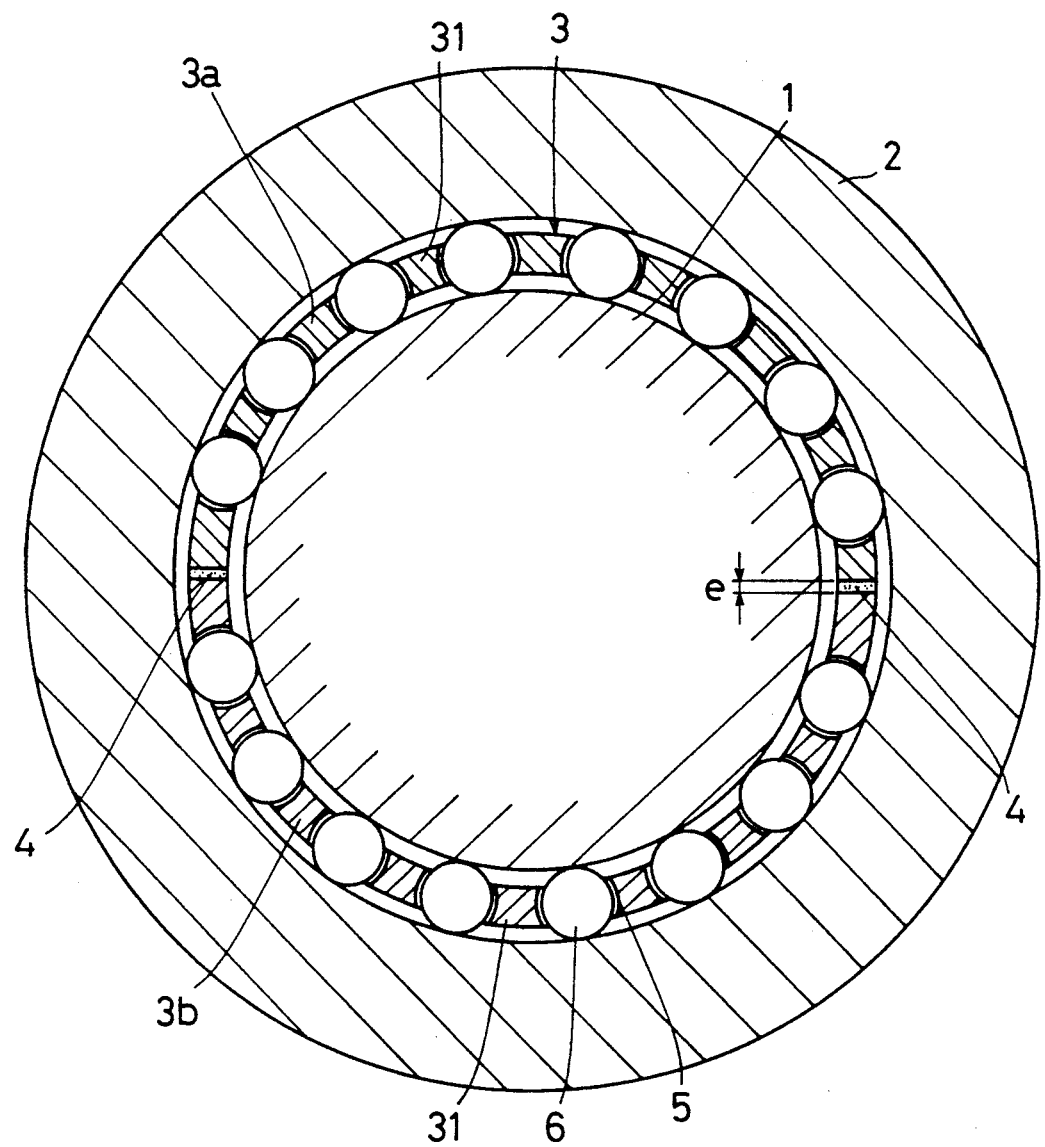
FIG. 1 is a transverse sectional view of a needle roller bearing according to a preferred embodiment of the present invention.
Figure 2:
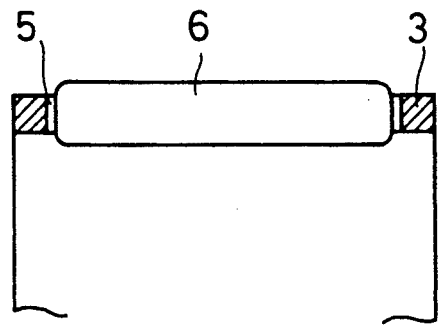
FIG. 2 is a longitudinal sectional view of the needle roller bearing of FIG. 1 showing one of a plurality of needle rollers employed therein.
Figure 3:
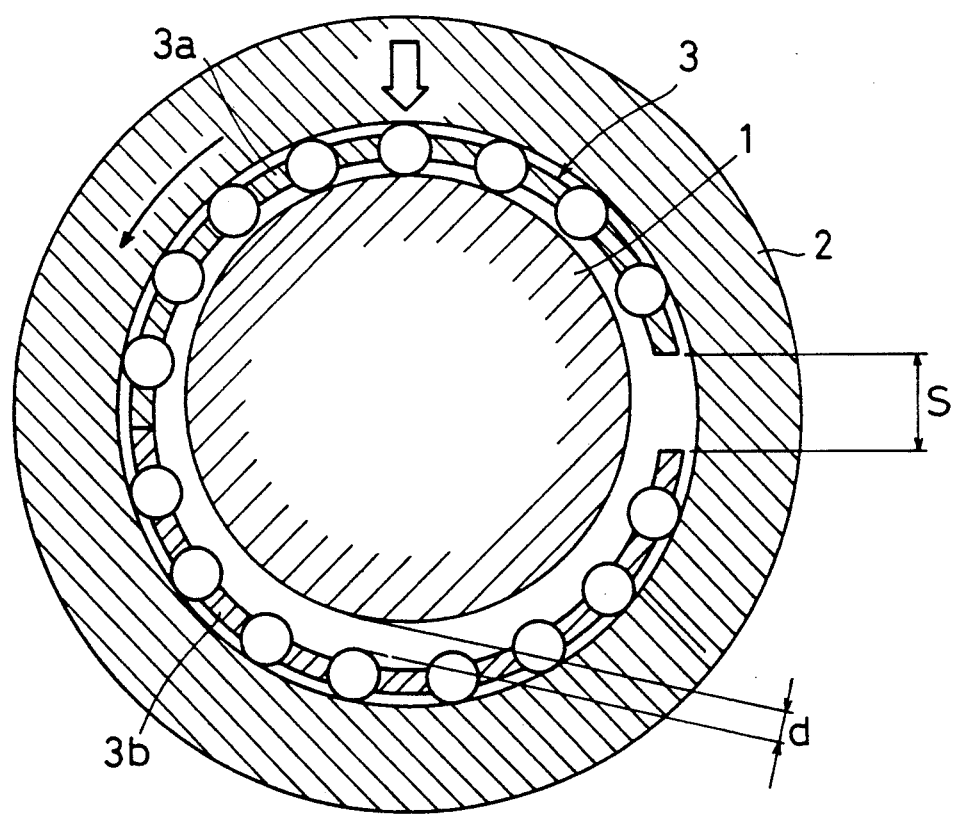
FIG. 3 is a transverse sectional view of the needle roller bearing showing how roller retainer halves work.

With reference to FIGS. 1 to 3 showing a preferred embodiment of the present invention, a needle roller bearing shown therein is adapted to be interposed between first and second elements that are rotatable relative to each other. So far shown, the first and second elements are employed in the form of an inner race 1 and an outer race 2, respectively, which are disposed coaxially one inside the other for rotation relative to each other. The illustrated needle roller bearing comprises a generally cylindrical roller retainer 3 interposed between the inner and outer races 1 and 2 for supporting a plurality of needle rollers, generally identified by 6, in a circumferentially spaced relationship with each other.

The roller retainer 3 is made up of a pair of generally semicircular retainer segments 3a and 3b of substantially identical construction. In an assembled state, the semicircular retainer segments 3a and 3b are, so far illustrated therein, bonded together to represent a cylindrical shape coaxial with a common longitudinal axis of any one of the inner and outer races 1 and 2 by means of bond deposits 4 that are filled in gaps between circumferentially spaced opposite side edges of the respective semicircular retainer segments 3a and 3b.

Figure 4:
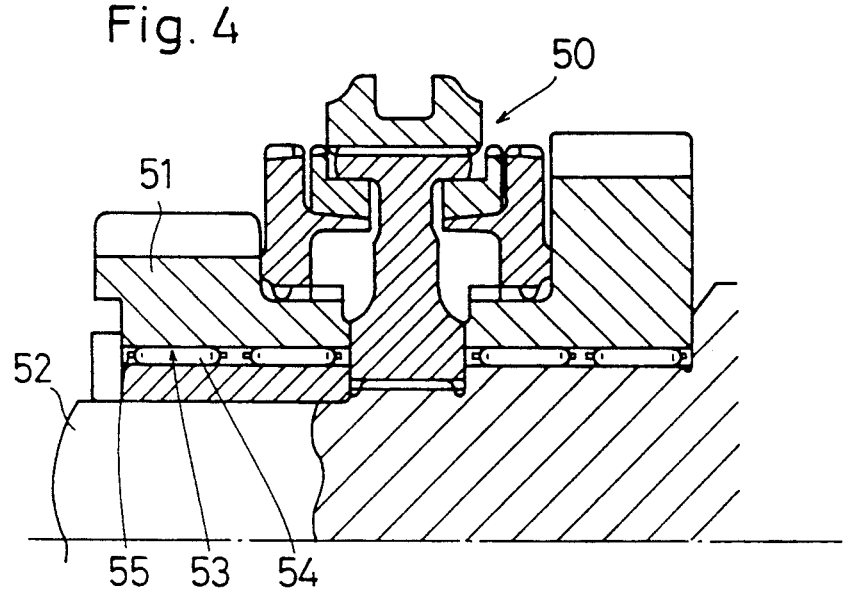
FIG. 4 is a fragmentary longitudinal sectional view of a portion of the automotive transmission showing an example of use of the conventional needle bearing.

It is to be noted that, where the needle roller bearing embodying the present invention is to be used in the automotive transmission such as shown in FIG. 4, the inner and outer races 1 and 2 may be constituted by the idler gear 51 and the drive shaft 52, respectively.

It is also to be noted that, instead of the use of the two circumferentially spaced bond deposits 4, a single bond deposit may be employed between one of the opposite side edges of the semicircular retainer segment 3a and a mating one of the opposite side edges of the semicircular retainer segment 3b.

In either case, the bond deposits 4 may be made of a bonding material of a kind exhibiting a bondability that lowers at an elevated temperature. This bonding material may include, for example, viscous material containing, as its principal component, vinyl acetate resin, or any other bonding agent of hot-melt type.

The viscous material containing the vinyl acetate resin as its principal component has a property of softening when heated to a temperature equal to or higher than 60° under normal pressures, for example, when held in contact with hot water, with its bondability consequently lowered. One example of this viscous material includes a "TOUGHGRIP" trademarked product sold by Kobayashi Pharmaceutical Co., Ltd. of Japan, which product softens to loosen the bondability thereof at a temperature around 80° C.

The hot-melt bonding material may be an ethylene-vinyl acetate copolymer, an ethylene-acrylic acid copolymer, or a polymer containing polyolefin, polyamide, polyester or rubber, all of which melt at a temperature ranging from 60 to 200° C.

In the practice of the present invention, the particular bonding material which eventually forms the bond deposits 4 should be of a type having a melting point chosen in consideration of a condition under which the needle roller bearing embodying the present invention is utilized.

The generally cylindrical roller retainer 3 is of a cage type having a plurality of circumferentially spaced and generally elongated pockets defined therein for accommodating the corresponding needle rollers 6, while forming a plurality of pillars 31 between the pockets 5. As best shown in FIG. 2, each of the elongated pockets 5 is so designed that, when the corresponding needle roller 6 is inserted therein, opposite ends of such needle roller 6 can be rotatably retained in position with no possibility of dropping out therefrom in an axial direction thereby guiding the cylindrical roller retainer 3 by the needle rollers 6. The cylindrical roller retainer 3 may have an outer diameter enough to permit an outer peripheral surface thereof to be held in sliding contact with an inner peripheral surface of the outer race 2.

The pockets 5 and, hence, the needle rollers 6 accommodated therein, may be spaced at either an equal pitch or an irregular pitch in a direction circumferentially thereof. Each of the semicircular retainer segments 3a and 3b may be prepared by cutting a metal strip from a metal sheet by the use of any known press work and subsequently subjecting the metal strip to a soft nitrating process, or may be molded of a synthetic resin.

When the needle roller bearing according to the present invention that is constructed as herein before described is assembled or mounted on a machine element, for example, a rotary shaft, the semicircular retainer segments 3a and 3b may be deemed and handled as a single integer of roller retainer 3. Therefore, there is no substantial need to mount the outer race 2 while the semicircular retainer segments 3a and 3b are manually held in position should one or both of the semicircular retainer segments 3a and 3b should fall by gravity or separate from the position where they should have been held. This brings about an improvement in work efficiency.

Also, the mounting of the semicircular retainer segments 3a and 3b to form the roller retainer 3 on the inner race 1, or the machine element forming the inner race, may not be immediately followed by the mounting of the outer race 2 since the semicircular retainer segments 3a and 3b are already held in position by means of the bond deposits 4 to thereby form the roller retainer 3, and therefore, with the needle roller bearing according to the present invention, a relatively large freedom of mounting work order of the bearing is available.

Although the bond deposits 4 are solid or substantially solid enough to connect the semicircular retainer segments 3a and 3b together at the time the needle roller bearing of the present invention has been set up, the bond deposits 4 detach from the associated gaps or melt during an operation of the needle roller bearing with an increase of the temperature thereof, thereby allowing the semicircular retainer segments 3a and 3b to be separated from each other within an annular space delimited between the inner and outer races 1 and 2. Specifically, where the needle roller bearing of the present invention is utilized in a heated oil bath or a high temperature environment, the bond deposits 4 can detach or melt having been heated by the ambient temperature.

Once the semicircular retainer segments 3a and 3b have been separated from each other in the manner described above, circumferentially spaced gaps which had been occupied by the respective bond deposits 4 are formed between the semicircular retainer segments 3a and 3b. In practice, however, during the rotation of the outer race 2 relative to the inner race 1, one of the semicircular retainer segments 3a and 3b is displaced in a circumferential direction relative to the other of the semicircular retainer segments 3a and 3b, thereby forming, as exaggeratedly shown in FIG. 3, a gap S between one of the opposite side edges of the semicircular retainer segment 3a and a corresponding one of the opposite side edges of the semicircular retainer segment 3b.

This gap S is of a size corresponding to twice the thickness, indicated by e in FIG. 1, of each bond deposit 4 plus a quantity determined by a radial clearance d between the outer peripheral surface of the inner race 1 and one of the needle rollers 6 radially outwardly displaced furthest from the inner race 1 as shown in FIG. 3. Thus, the semicircular retainer segments 3a and 3b carrying the needle rollers 6 are allowed to displace freely within the annular space between the inner and outer races 1 and 2 an angular distance corresponding to the size of the gap S. Accordingly, in the event, for example, that the inner and outer races 1 and 2 rotate together therewith in an idling mode while the needle roller bearing as a whole is loaded in a direction shown by the arrow in FIG. 3, the semicircular retainer segment 3b so far shown in FIG. 3, is held substantially in a non-loaded state with no driving force transmitted thereto and, consequently, an angular movement of the semicircular retainer segment 3b about the longitudinal axis of the needle roller bearing is delayed a length of time determined by the size of the gap S. In other words, the angular movement of the semicircular retainer segment 3b relative to any one of the inner and outer races 1 and 2 takes place and, therefore, any possible occurrence of the fretting phenomenon can advantageously be minimized or substantially eliminated.

Although the present invention has been fully described in connection with the preferred embodiment thereof with reference to the accompanying drawings which are used only for the purpose of illustration, those skilled in the art will readily conceive numerous changes and modifications within the framework of obviousness upon the reading of the specification herein presented of the present invention. For example, although the needle roller bearing embodying the present invention has been described as applied to the idler bearing in the automotive transmission, it can be equally used on a shaft having an annular recess circumferentially defined therein for receiving the bearing, a big end of a piston connecting rod or any other shaft or stud of relatively large diameter. In such case, the separate semicircular retainer segments 3a and 3b are individually mounted on the shaft and are then temporarily retained in position on the shaft by the use of the bond deposits 4. In this way, the semicircular retainer segments 3a and 3b can be handled as an assembly in which the segments 3a and 3b are so mounted and retained in position on the shaft.

Accordingly, such changes and modifications are, unless they depart from the spirit and scope of the present invention as delivered from the claims annexed hereto, to be construed as included therein.

What is claimed is:

1. A needle roller bearing adapted to be interposed between first and second elements rotatable relative to each other, said bearing comprising a generally cylindrical roller retainer disposed within an annular space defined between the first and second elements and carrying a plurality of needle rollers, said roller retainer being comprised of circumferentially separated retainer segments each having first and second side edges opposite to each other, at least said first side edges of the respective retainer segments defining a circumferential gap therebetween, said gap being filled up by a bond deposit having a bondability that is lowered when heated to an elevated temperature.

2. The needle roller bearing as claimed in claim 1, wherein said bond deposit is formed by a bonding material selected from the group consisting of viscous material containing, as a principal component, vinyl acetate resin, and a hot-melt bonding material.

3. The needle roller bearing as claimed in claim 1, wherein said bond deposit softens to loose the bondability at a temperature equal to or higher than 60° C. under normal pressures.

4. The needle roller bearing as claimed in claim 1, wherein said bond deposit melts at a temperature equal to or higher than 60° C. under normal pressures.

5. The needle roller bearing as claimed in claim 1, wherein an additional bond deposit is filled in an additional gap defined between the second side edges of the respective retainer segments.

* * * * *